L. LÖWENSTEIN.
PROCESS FOR THE FRACTIONAL CONDENSATION OF VAPORS.
APPLICATION FILED APR. 8, 1908.
898,980.
Patented Sept. 15, 1908.
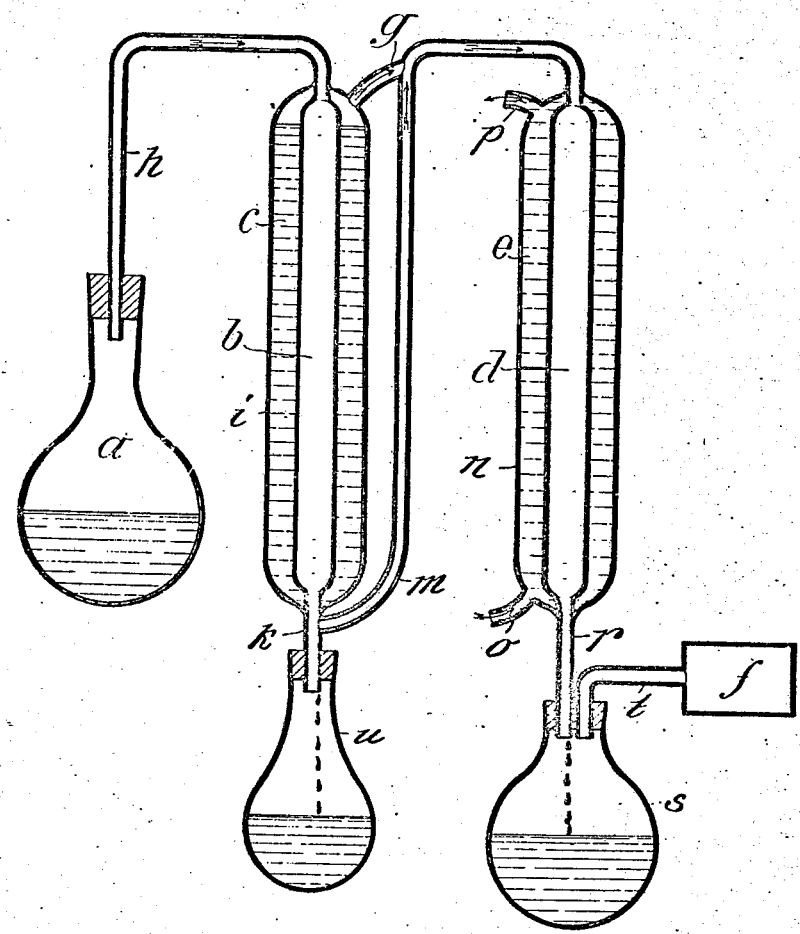
Witnesses:
Inventor
Leo Löwenstein
By
James L. Norris

UNITED STATES PATENT OFFICE.

LEO LÖWENSTEIN, OF VIENNA, AUSTRIA-HUNGARY.

PROCESS FOR THE FRACTIONAL CONDENSATION OF VAPORS.

No. 898,980.  Specification of Letters Patent.  Patented Sept. 15, 1908.

Application filed April 8, 1908. Serial No. 425,926.

*To all whom it may concern:*

Be it known that I, LEO LÖWENSTEIN, subject of the Emperor of Germany, residing at Vienna, Austria-Hungary, have invented certain new and useful Improvements in Processes for the Fractional Condensation of Vapors, of which the following is a specification.

In the fractional cooling of vapors which are under a different pressure to that of the atmosphere, the main difficulty consists in adjusting the temperature of the cooling liquid to the temperature of condensation of the vapor to be condensed for the time being. This temperature depends more especially on the prevailing barometric pressure which is different when working at different times and often changes rapidly. Thus if the barometric pressure rises and causes the temperatures of condensation to rise therewith it may happen for example that vapors, which are to be separated by bodies of cooling water of different temperatures will be condensed in warmer condensers and in the converse case, will be condensed in cooler condensers. It has been discovered that these difficulties can be obviated in the following simple manner:—In the ordinary practice of the art, for the purpose of cooling the several fractions, boiling liquids which boil at the same or a suitably higher temperature than the vapor to be condensed thereby, are employed in a well-known manner and independently of the vapors to be condensed, i. e., under different or independent atmospheric pressures from that of the said vapors. According to the present process these bodies of cooling liquids do not boil independently under the atmospheric or any other pressure as in the known processes, but are connected pneumatically with the vapors to be condensed. In practice, this is effected when distilling under reduced pressure for example, by allowing the distilling liquid mixture and the cooling liquids to boil under the same reduced pressure. If now the pressure in the pressure reduction chamber falls or rises, the temperatures of condensation vary in the same manner and at just the same rate as the boiling temperatures of the cooling liquids. The proceeding takes place in an analogous manner in fractional cooling under a pressure higher than that of the atmosphere.

The accompanying drawing illustrates a preferred form of apparatus for carrying out the process involved, the apparatus being shown in vertical longitudinal section.

An experiment in which a dilute solution of hydrogen peroxid is condensed to form a high per cent. solution, may here serve as an example, the process being described in connection with its attendant apparatus. From the distilling flask $a$, in which a dilute solution of hydrogen peroxid boils under reduced pressure, the vapors pass by way of a bent tube $h$ downwardly through an ordinary Liebig's condenser $b$ in which the cooling water $c$, contained in a surrounding jacket $i$ is not renewed during the experiment. The condenser $b$ is formed at its lower end with a tube $k$ leading from the interior thereof, which tube $k$ extends into the mouth of a container $u$. The condensed vapors pass by way of the tube $k$ into the container $u$. The uncondensed vapors then pass by way of a bent tube $m$ leading from the tube $k$ into the interior of a second condenser $d$ which is continuously cooled by cold running water $e$, contained in a surrounding jacket $n$ which has at its lower end an inlet $o$ and at its upper end an outlet $p$, in order that circulation may be maintained if desired. The condenser $d$ is formed at its lower end with a tube $r$ leading from the interior thereof, which tube $r$ extends into the mouth of a container $s$. The remaining vapors condensed in the condenser $d$ pass into the container $s$ through the tube $r$. The container $s$ is connected by means of a tube $t$ which projects slightly into the mouth thereof with a pressure reduction chamber $f$. The jacket $i$ is formed at its upper end with a tube $g$ which is joined to and communicates with the tube $m$. The cooling water $c$ in the condenser $b$ is therefore under the same reduced pressure as controlled by the reduction chamber $f$ as that under which the mixture of hydrogen peroxid and water in $a$ boils. The vapors coming from the latter alone maintain the boiling of the cooling water $c$ in the condenser $b$. External heating is not necessary. Almost all the hydrogen peroxid with only a little water then condenses in the condenser $b$ and collects in the container $l$ while almost all the water and only extremely little hydrogen peroxid is condensed in the condenser $d$ and collects in the container $s$. The process can also be employed for the direct production of very highly concentrated solutions of hydrogen peroxid, for which purpose the condensation of the vapors resulting from the distillation is effected by employing the improved process, in which all or almost all the hydrogen peroxid can be obtained in one operation in the form of a high per cent., for example, a 60% solution while the water passing over is condensed at another place.

By means of the pipe connection $g$ between the jacket $i$ and the upper bent portion of the tube $m$ the same reduced pressure prevails in said jacket as in the condenser $d$ and the flask $a$ connected with the latter by the pipe $h$. In a similar manner to this substance, vapors containing sulfuric acid, glycerin, nitric acid, etc. which condense at a higher temperature than water can also be separated from water vapor, for example under a reduced pressure influence or at a higher pressure by cooling with water boiling at the same pressure. In the converse case, for example, in alcohol distillation, alcohol is used as the boiling cooling liquid. In the distillation of petroleum under a reduced or at a raised pressure, the corresponding fractions of the petroleum are employed as cooling liquids. Obviously in such cases the said cooling liquids can be replaced by others of the same boiling point. It may be possible that the temperature of a cooling liquid shall remain below the temperature of condensation of a particular vapor, but on the other hand it must be higher than that of the other vapor condensing at the next temperature. This can be effected by employing suitable salt solutions or other liquids which boil at the same degree of reduced pressure as the vapors to be condensed. This can also be effected by connecting for example, the space in which the cooling liquid boils, by means of a narrow tube with the pressure reduction chamber so that the pressure of the cooling liquid is always higher by a constant interval than the pressure in the reduction space of the vapor to be condensed. Obviously an interval such as this can also be produced by other known means. It will be understood that, for example, for the purpose of separating complicated mixtures of vapors, or in order to condense mixtures of vapors of similar chemical composition into liquids of different concentrations several of the arrangements above described can, if necessary, be connected one behind another.

Claims:—

1. The herein described method for the fractional condensation of vapors which consists in distilling a mixture of liquids under a reduced pressure influence and in cooling the vapors by an agent under the same reduced pressure influence as the mixture of liquids, which agent has a boiling temperature equal to the boiling temperature of one of the liquids of said mixture and is heated to such temperature, the remainder of the liquids having boiling temperatures higher than that of the cooling agent and being condensed thereby.

2. The herein described method for the fractional condensation of vapors which consists in distilling a mixture of liquids under a reduced pressure influence, and in cooling the vapors by an agent under the same reduced pressure influence as the mixture of liquids, which agent has a boiling temperature equal to the boiling temperature of one of the liquids of said mixture and is heated to such temperature by the said liquid, the remainder of the liquids having boiling temperatures higher than that of the cooling agent and being condensed thereby.

In testimony whereof I have hereunto set my hand in presence of two subscribing witnesses.

LEO LÖWENSTEIN.

Witnesses:
 JOSEF RUBRESCH,
 AUGUST FUGGER.